United States Patent [19]

Ducharme et al.

[11] Patent Number: 5,397,147
[45] Date of Patent: Mar. 14, 1995

[54] VEHICULAR WORK TABLE APPARATUS

[76] Inventors: Arthur W. Ducharme, P.O. Box 179, North Oxford, Mass. 01537; David W. Carson, P.O. Box 66, Readsboro, Vt. 05350

[21] Appl. No.: 136,902
[22] Filed: Oct. 18, 1993
[51] Int. Cl.⁶ .......................... B25H 1/00; B60R 11/06
[52] U.S. Cl. ................................ 280/415.1; 280/769; 224/42.07; 224/42.08; 224/273
[58] Field of Search ...................... 280/415.1, 504, 769; 224/42.03 A, 42.06, 42.07, 42.08, 42.03 R, 273, 42.42, 42.45 R, 42.41; 248/286, 287

[56] References Cited

U.S. PATENT DOCUMENTS

| | | | |
|---|---|---|---|
| 4,029,245 | 6/1977 | Berlin | 224/42.07 X |
| 4,378,888 | 4/1983 | Reed | 224/273 X |
| 4,461,412 | 7/1984 | Langland | 224/273 |
| 4,576,395 | 3/1986 | Longoria | 280/511 |
| 4,768,690 | 9/1988 | Stoutenburg | 224/273 |
| 4,949,945 | 8/1990 | Whiteley | 269/71 |
| 5,038,983 | 8/1991 | Tomososki | 224/42.07 X |
| 5,082,037 | 1/1992 | Hammons et al. | 248/287 X |
| 5,106,002 | 4/1992 | Smith et al. | 224/42.03 A |
| 5,267,748 | 12/1993 | Curran | 280/415.1 |

FOREIGN PATENT DOCUMENTS 2258200  2/1993  United Kingdom ......... 224/42.03 R

Primary Examiner—Karin L. Tyson
Assistant Examiner—F. Zeender
Attorney, Agent, or Firm—Hugh E. Smith

[57] ABSTRACT

A vehicular work table apparatus comprising a vehicular work table apparatus coupleable to a hitch chassis of a vehicle comprising of a pedestal formed of a rod, the rod including a base end, a support end, and a intermediate location defined between the base end and the support end, the rod further including a support segment and a base segment, the support segment extending upwards from the intermediate location to the support end, the base segment extending from the intermediate location to the base end, the base end adapted to be coupled to a vehicle's hitch chassis to place the pedestal in an upright configuration. A plate coupled to the support end of the pedestal to define a table top, with the pedestal and table top defining a table. A means for coupling the table to a vehicle to place the table in a stowed configuration.

1 Claim, 4 Drawing Sheets

VEHICULAR WORK TABLE APPARATUS

BACKGROUND OF THE INVENTION

1. Field of the Invention

The present invention relates to a vehicular work table apparatus and more particularly pertains to a devices which may be attached to a vehicle to support tools and equipment.

2. Description of the Prior Art

The use of devices to support tools and equipment is known in the prior art. More specifically, devices heretofore devised and utilized for the purpose of supporting tools and equipment are known to consist basically of familiar, expected and obvious structural configurations, notwithstanding the myriad of designs encompassed by the crowded prior art which have been developed for the fulfillment of countless objectives and requirements.

Patents that illustrate table-like components generally related to the invention are U.S. Pat. Nos. 4,949,945 to Whitely and 4,382,588 to Vovk. Other components are disclosed in U.S. Pat. Nos. 3,718,327 to Nunez; 4,657,234 to Stout and 4,109,900 to Vandecoevering.

While the devices fulfill their respective, particular objective and requirements, the aforementioned patents to Whitley and Vovk describe vehicular work tables that are coupled to the hitch chassis of a vehicle when operable or coupled to the wheel well within the bed of a vehicle when stowed. The other patents set forth above require vice-like arrangements for their support.

In this respect, the vehicular work table apparatus according to the present invention substantially departs from the conventional concepts and designs of the prior art, and in doing so provides an apparatus primarily developed for the purpose of supporting tools and equipment with respect to a vehicle.

Therefore, it can be appreciated that there exists a continuing need for an improved device which can be used to support equipment and tools on a vehicle. In this regard, the present invention substantially fulfills this need.

SUMMARY OF THE INVENTION

In the view of the foregoing disadvantages inherent in the known types of devices for supporting tools and equipment on a vehicle now present in the prior art, the present invention provides an improved vehicular work table apparatus. As such, the general purpose of the present invention, which will be described subsequently in greater detail, is to provide a new and improved device for supporting tools and equipment on a vehicle which has all the advantages of the prior art and none of the disadvantages.

To attain this, the present invention essentially comprises, in combination, a pedestal and a vehicular work table apparatus coupleable to a hitch chassis of a vehicle comprising of a pedestal formed of a hollow rod wherein the rod is fabricated of a rigid material, the rod including a base end, a support end, and a intermediate location defined between the base end and the support end, the base end having a safety pin receiving hole disposed therethrough, the rod further including a support segment and a base segment, the support segment extending upwards from the intermediate location to the support end, the base segment extending in a generally horizontal direction from the intermediate location to the base end, the base segment adapted to extend essentially horizontally during operation and use with the support segment extending upwardly therefrom at an angle of between about 50 and 70 degrees, the base end adapted to be coupled to a hitch chassis of a vehicle to place the pedestal in an upright configuration when the base end is inserted into the hitch receiving hole of a vehicle's hitch chassis. A rigid and essentially rectangular plate coupled to the support end of the pedestal to define a table top, with the pedestal and table top defining a horizontally disposed table when so coupled. A hollow rigid tube adapted to be coupled to the wheel well of a vehicle to define a table holder, the tube having a safety pin receiving hole disposed therethrough, the tube further adapted to be coupled to the base end of the table to place the table in a stowed configuration when the base end is inserted into the tube and the safety pin is disposed through the safety pin receiving hole of the tube. A safety pin with a chain coupling the pin to the base segment adjacent to the base and, the safety pin being adapted to be inserted through the receiving hold of the hitch chassis and the hole of the base during operation and use and adjusted to be inserted through the receiving hold of the rigid tube and the hold of the base end when stowed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular work table apparatus which has all the advantages of the prior art and none of the disadvantages.

It is another object of the present invention to provide a new and improved vehicular work table apparatus which may be easily and efficiently manufactured and marketed.

It is a further object of the present invention to provide a new and improved vehicular work table apparatus which is of durable and reliable construction.

An even further object of the present invention is to provide a new and improved vehicular work table apparatus which is susceptible of a low cost of manufacture with regard to both materials and labor, and which accordingly is then susceptible of low prices of sale to the consuming public, thereby making such a vehicular work table apparatus economically available to the buying public.

Still another object of the present invention is to provide a new and improved vehicular work table apparatus which provides in the apparatuses and methods of the prior art some of the advantages thereof, while simultaneously overcoming some of the disadvantages normally associated therewith.

Still another object of the present invention is to support tools and equipment with respect to a vehicle.

Yet another object of the present invention is to stow a portable work table apparatus on the bed of a pickup truck, the rear compartment of a van, or the trunk of an automobile and to readily deploy such work table as needed.

Yet another object of the present invention is to quickly move a work table apparatus between a stowed position and an operable configuration.

Even still another object of the present invention is to provide a new and improved vehicular work table apparatus comprising of a vehicular work table apparatus coupleable to a hitch chassis of a vehicle comprising of a pedestal formed of a rod, the rod including a base end, a support end, and a intermediate location defined between the base end and the support end, the rod further including a support segment and a base segment, the support segment extending upwards from the intermediate location to the support end, the base segment extending from the intermediate location to the base end, the base end adapted to be coupled to a vehicle's hitch chassis to place the pedestal in an upright configuration. A plate coupled to the support end of the pedestal to define a table top, with the pedestal and table top defining a table. A means for coupling the table to a vehicle to place the table in a stowed configuration.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
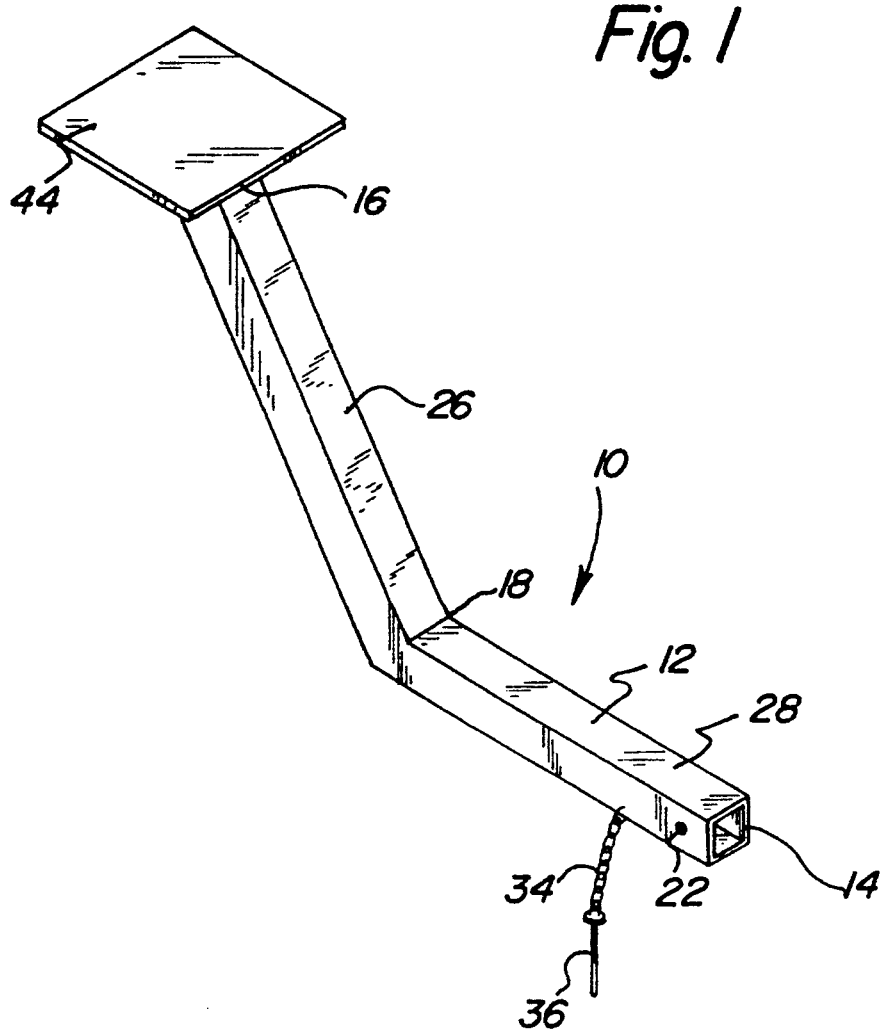
FIG. 1 is a perspective view of the vehicular work table apparatus constructed in accordance with the principles of the present invention.
Figure 2:
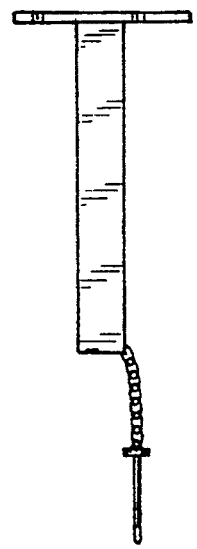
FIG. 2 is a front elevational view of the vehicular work table apparatus of FIG. 1.
Figure 3:
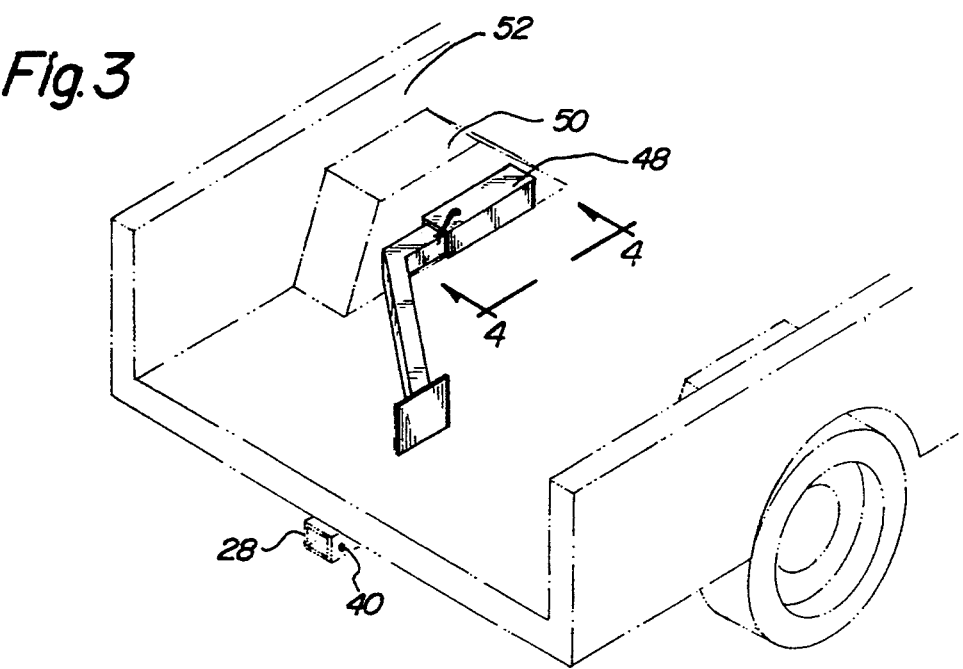
FIG. 3 is a perspective view of the vehicular work table apparatus in a stowed orientation in the bed of a pickup truck.
Figure 4:
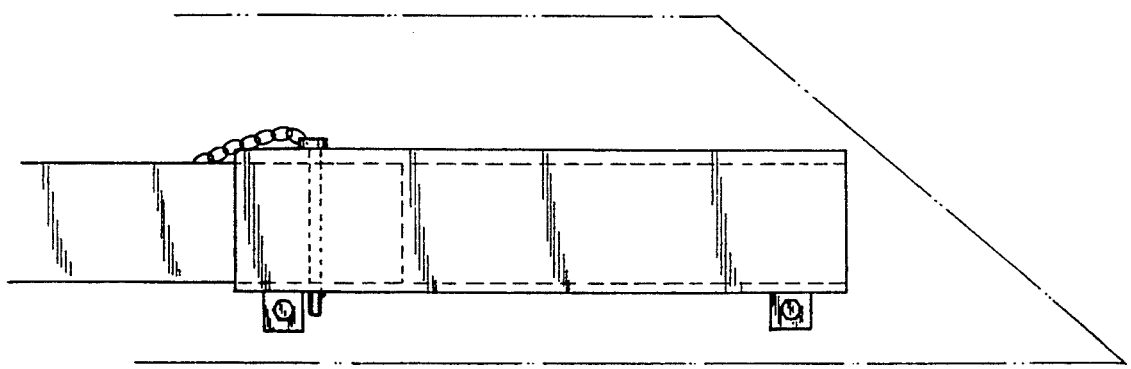
FIG. 4 is an enlarged view of a portion of the vehicular work table apparatus in a stowed configuration taken along the line 4—4 of FIG. 3.

With reference now to the drawings, and in particular, to FIG. 1-8 thereof, a new and improved vehicular work table apparatus embodying the principles and concepts of the present invention and generally designated by the reference number 10 will be described.

The vehicular work table apparatus 10 comprises a pedestal formed of a hollow rod 12. The rod is of a generally rigid material, preferably a high carbon steel. The rod includes a base end 14, a support end 16, and a intermediate location 18 defined between the base end and the support end.

The base end 14 has there adjacent, a safety pin receiving hole 22 disposed therethrough. The rod further includes a support segment 26 and a base segment 28. The support segment extends upwards from the intermediate location to the support end. The base segment extends in a generally horizontal direction from the intermediate location to. The base end has a safety pin 32 coupled thereto by a chain 34.

The base end is adapted to be coupled to a vehicle's hitch chassis 38 to place the pedestal in an upright essentially horizontal orientation when the base end is inserted into the hitch receiving hole 40 of a vehicle's hitch chassis 38 and the safety pin is disposed through safety pin receiving hole 40 of a vehicle's hitch chassis 28 and safety pin receiving hole 22 of the base segment 28 for greater securement during operation and use.

A rigid and essentially rectangular plate 44 is coupled to the support end 16 of the pedestal to define a table top. The pedestal and table top define a table.

A hollow rigid tube 48 is adapted to be coupled to the wheel well 50 of a vehicle 52 to define a table holder during a stored orientation. The tube 48 has a safety pin receiving hole disposed therethrough. The tube is further adapted to be coupled to the base end 14 of the table to thereby place the table in a stowed configuration when the base end is inserted into the tube. The safety pin is disposed through the safety pin receiving hole 54 of the tube 48 and safety pin receiving hole 22 of the base end 14. This provides positive securement of the apparatus 10 when stored.

Figure 5:
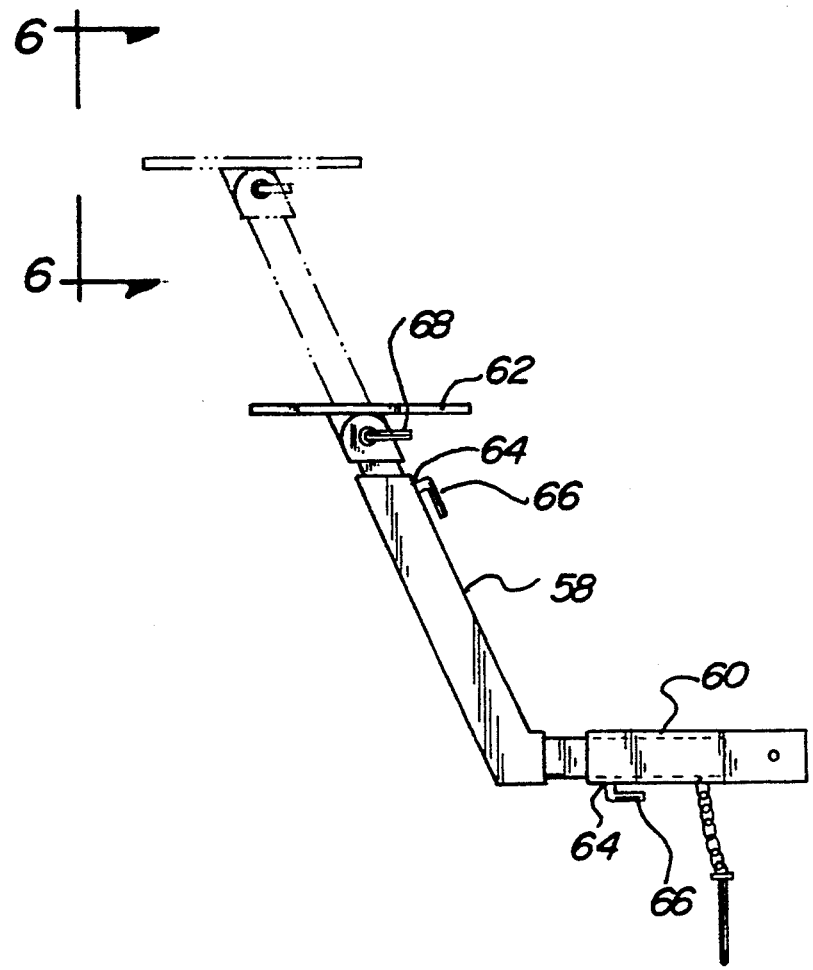
FIG. 5 is a side elevational view of an alternate embodiment of the invention.
Figure 6:
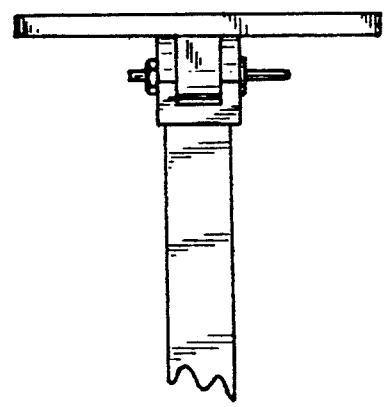
FIG. 6 is an enlarged front elevational view of the table top portion of the vehicular work table apparatus taken along the line 6—6 of FIG. 5.
Figure 7:
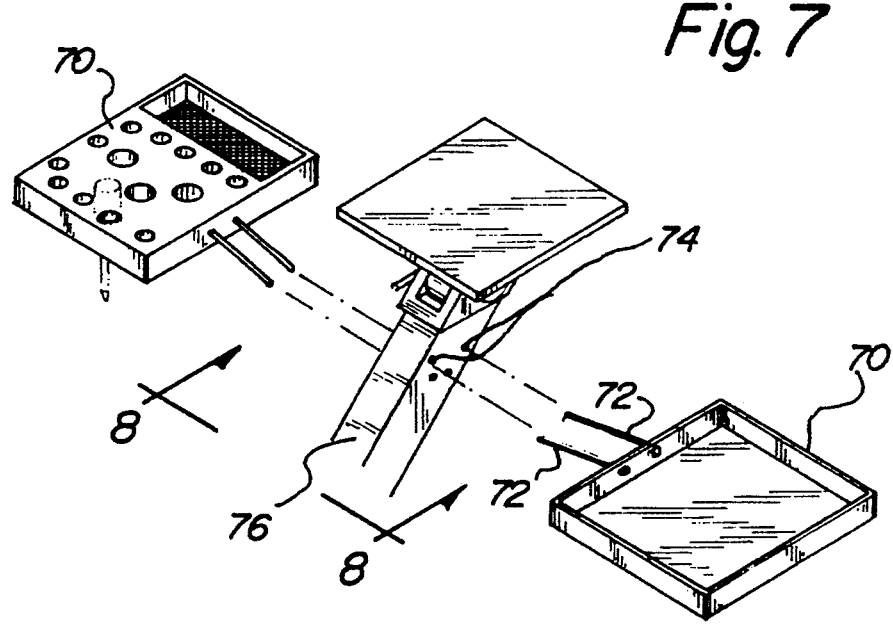
FIG. 7 is a view of the tray area constructed in accordance with yet another alternate embodiment of the invention; and, FIG. 8 is a close-up view of the tray area taken along the line 8—8 of FIG. 7.
Figure 8:
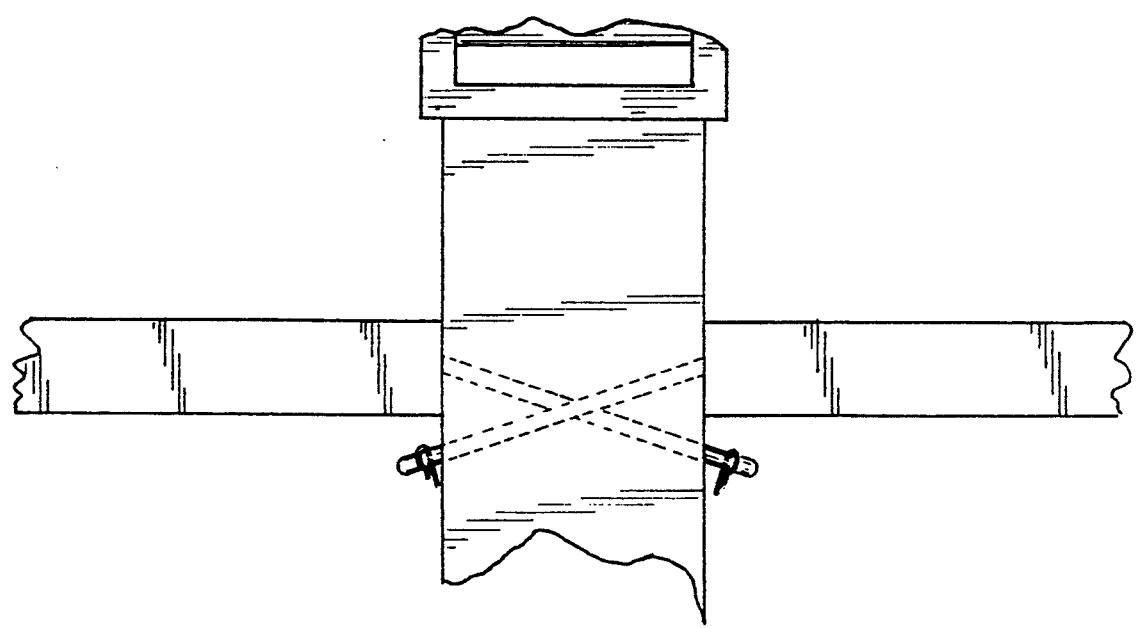

An alternate embodiment of the present invention is shown in FIGS. 5 and 6. Such embodiment comprises substantially all of the features of the first embodiment but further including a support segment 58 that is vertically extendable, a base segment 60 is that horizontally extendable, and a plate 62 that is rotatable about an axis perpendicular with respect to the support segment. Thereby allowing the table top to be tilted. The vertical and horizontal adjustability is effected through telescoping segments with adjustable holes 64. A locking pin 66 effects securement. Rotatable securement of the table is through a threaded screw 68 to lock and unlock the table as desired.

A further alternate embodiment of the present invention comprises substantially all of the features of the first and second embodiments further including a plurality of supplemental trays 70 coupled to the support segment by angled pins 72 extending through holes 74 in the support segment 76. The trays 70 are for holding tools, parts, and the like. Note FIGS. 7 and 8.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicular work table apparatus coupleable to a hitch chassis of a vehicle comprising:

a pedestal formed of a hollow rod wherein the rod is fabricated of a rigid material, the rod including a base end, a support end, and an intermediate location defined between the base end and the support end, the base end having a safety pin receiving hole disposed therethrough, the rod further including a support segment and a base segment, the support segment extending upwards from the intermediate location to the support end, the base segment extending in a generally horizontal direction from the intermediate location to the base end, the base segment adapted to extend essentially horizontally during operation and use with the support segment extending upwardly therefrom at an angle of between about 50 and 70 degrees, the base end adapted to be coupled to a hitch chassis of a vehicle having a hitch receiving hole;

a rigid and essentially rectangular plate coupled to the support end of the pedestal to define a table top, with the pedestal and table top defining a horizontally disposed table when so coupled;

a hollow rigid tube adapted to be coupled to a wheel well of a vehicle to define a table holder, the tube having a safety pin receiving hole disposed therethrough, the tube further adapted to be coupled to the base segment to place the table in a stowed configuration when the base end is inserted into the tube; and a safety pin with a chain coupling the pin to the base segment adjacent to the base end, the safety pin being adapted to be inserted through the hitch receiving hole of the hitch chassis and the safety pin receiving hole of the base end during operation and use and adjusted to be inserted through the safety pin receiving hole of the rigid tube and the safety pin receiving hole of the base end when stowed.

* * * * *